United States Patent
Karnik et al.

[11] 3,964,418
[45] June 22, 1976

[54] FLOATING CAMPGROUND

[76] Inventors: Stanley D. Karnik, 374 Limestone Road, Ridgefield, Conn. 06877; Terry E. Morgan, 2094 Maple Ave., Peekskill, N.Y. 10566

[22] Filed: Mar. 6, 1974

[21] Appl. No.: 448,739

[52] U.S. Cl. ............................ 114/70; 114/235 R
[51] Int. Cl.² ............................ B63B 27/14
[58] Field of Search ............... 114/.5 F, .5 BD, 26, 114/43.5, 60, 70, 235 R, 202; 52/66, 261; D13/DIG. 1; 9/1 R, 1 T

[56] References Cited
UNITED STATES PATENTS

| | | | |
|---|---|---|---|
| 2,150,763 | 3/1939 | Elliott | 114/202 |
| 2,972,975 | 2/1961 | White | 114/72 |
| 3,320,918 | 5/1967 | Zalejski | 114/70 |
| 3,398,716 | 8/1968 | Neilson | 114/235 R |
| 3,815,299 | 6/1974 | Sorensen et al. | 52/66 |

FOREIGN PATENTS OR APPLICATIONS

| | | | |
|---|---|---|---|
| 1,525,436 | 4/1968 | France | 114/.5 D |
| 1,564,002 | 3/1969 | France | 114/72 |

*Primary Examiner*—Trygve M. Blix
*Assistant Examiner*—Jesus D. Sotelo
*Attorney, Agent, or Firm*—Richard A. Joel

[57] ABSTRACT

A floating campgrounds comprises one or more barge type units which are coupled together to form an integral camping system. A typical floating campground would include fenced areas on the upper surface thereof where recreational vehicles are secured, storage facilities in the hull for automobiles, camping support facilities and a tug or tow type vessel to move the barge units over waterways. The various barges would also include facilities such as a swimming pool, restaurant and recreational and living facilities. The barge system would travel over inland waterways, while campers live in their vehicles and enjoy the facilities provided on board. This transport arrangement would result in considerable fuel savings while providing a unique flexible vacation environment.

10 Claims, 5 Drawing Figures

FLOATING CAMPGROUND

BACKGROUND OF THE INVENTION

The present invention relates to transport system and particularly to a transport system for recreational vehicles which includes recreational facilities for individuals on board.

In these days of fuel shortages, the recreational vehicle industry has experienced considerable difficulty after having achieved great heights of popularity in recent years. Recreational vehicles have found great acceptance as an economical and fun way to vacation and to tour the country. Furthermore, such vehicles ideally complement the trend to more outdoor living. Due to these factors, they are particularly attractive to families with children. It is naturally anticipated that owners will want to continue to use their vehicles and individuals will still purchase new vehicles despite the current "Energy Crisis" but the cost and lack of fuel has created uncertainty leading to severe problems for the industry.

It has also been noted that "auto-train" arrangements have been booming in popularity, and the only present drawback to further growth appears to be a lack of capacity. This service appears to have proven that individuals dislike driving over great distances when an alternative means of transportation is available, provided, however, they have auto transportation when they arrive. Many individuals also prefer using their own vehicles at their destination both from a personal and a cost standpoint.

The prior art includes U.S. Pat. 3,320,918 to Zalejski which pertains to a mortorized barge or the like which accommodates a plurality of vehicles. The patent discloses specifically a barge which serves as a parking lot and is adapted to be transported over a waterway to a more or less central mooring location. U.S. Pat. No. 3,335,437 to Judkins and U.S. Pat. No. 3,731,644 to Bradt disclose water vehicles which are adapted to receive and support pick-up truck type campers for recreational activity. Also of interest are U.S. Pat. Nos. 1,700,153 to Bradley, 3,335,436 to Sharp and 3,599,589 to Busey. The aforementioned patents are merely intended to be representative of the art in the general area of the present invention and are not intended to comprise an all inclusive list of such prior art.

SUMMARY OF THE INVENTION

As distinguished from the prior art discussed above, the present invention relates to a new camping arrangement for recreational vehicles wherein such vehicles are coupled to the deck of a barge type system and transported over inland waterways. The barge system includes recreational facilities on board such as swimming pools, eating facilities, toilet and shower facilities, etc. similar to conventional campground.

In a typical system, a plurality of barges would be coupled together to be driven either by integral propulsion means or by separate propulsion means. One or more of the barges in such a system would include a flat upper deck area and connecting means whereby the vehicles are coupled to the deck. Electrical, sewer and water hook-ups would also be provided for the vehicles.

Beneath the campground, storage space for vehicles and various facilities would be provided. One or more of the barges would include a swimming pool on the upper deck, a restaurant and a theater. Any number of variations of recreational facilities could be employed depending upon what has proven popular or what is desired by the campers.

Accordingly, it is an object of the invention to provide a unique floating campground for recreational vehicles over waterways.

It is another object of this invention to provide a new and improved floating campground wherein individuals may live in camping vehicles while being transported over inland waterways in a recreational environment.

BRIEF DESCRIPTION OF THE DRAWINGS

Other objects and advantages of the present invention may be more clearly seen when viewed in conjunction with the accompanying drawings wherein.

DETAILED DESCRIPTION OF THE INVENTION

Figure 1:
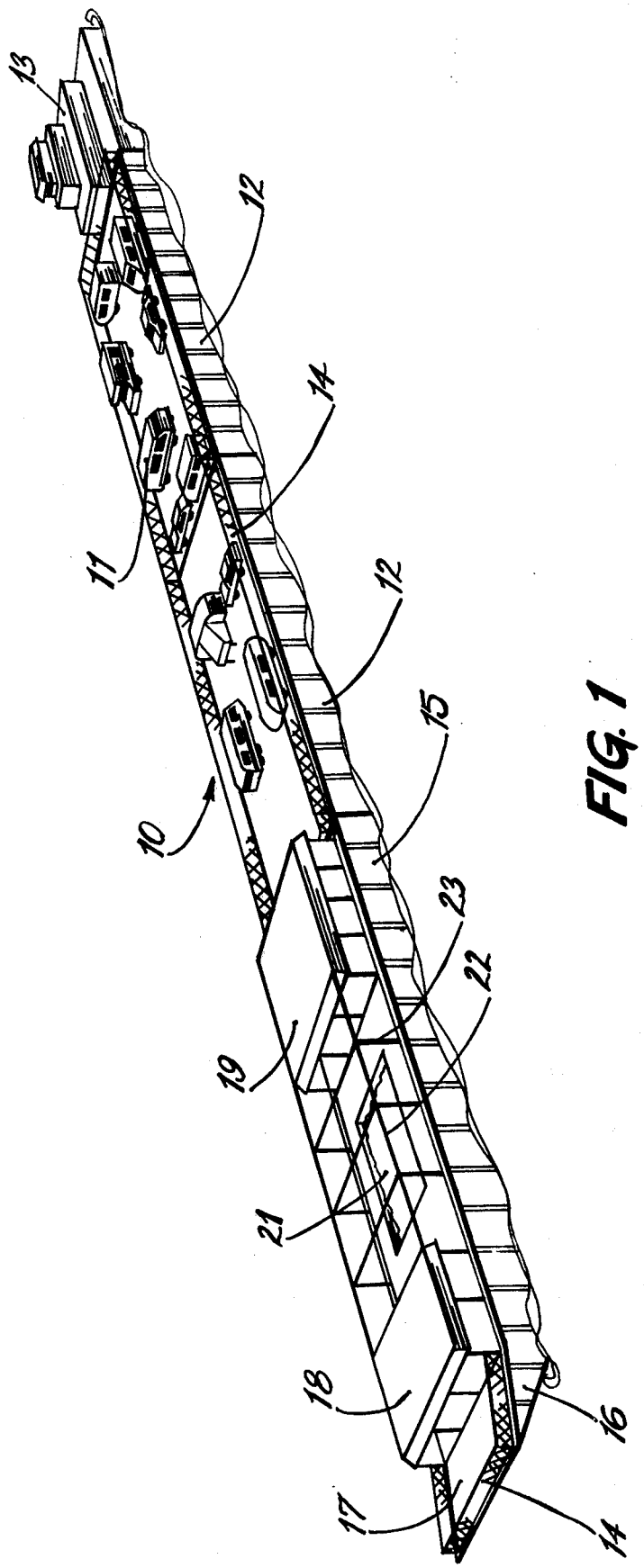
FIG. 1 is a perspective view of a typical transport system comprising the present invention.

With reference to FIG. 1 of the drawings, the invention comprises a floating campground 10 for recreational vehicles 11 including one or more separate camping barge units 12 and one or more recreational units 15 which are coupled together and driven over inland waterways by propulsion means 13. The individual units 12 and 15 are similar to conventional barges, but they are specifically designed to provide unique facilities so that the system is a complete recreational campground albeit a water-bound campground.

The recreational vehicles 11 are driven onto the units 12 as shown in FIG. 1 and securely parked thereon. The vehicles 11 may include motor homes, travel trailers, tent trailers, pickup campers, etc. The system can even accommodate individuals who prefer to pitch a tent. Sewer, water and electrical hookups 38 are provided for each of the vehicles. The units 12 whereon the vehicles are parked are surrounded by a fence 14 for purposes of safety. The fence 14, nevertheless, permits viewing therethrough and may, for example, comprise a plastic shield or mesh steel fence. As a further feature, the deck could be covered with artificial turf to make the area more esthetically appealing.

The recreation unit 15 in the front end of the system includes a rake end 16 for cutting through the water. A fenced viewing platform 17 may be provided over the rake end 16. Situated inwardly of the rake end 16 are enclosed structures 18 and 19 which are spaced apart and include an enclosed pool 21 therebetween. The structures 18 and 19 may include facilities such as a restaurant, snack bar, shops, a theater, or a general recreation room. The pool enclosure comprises a transparent curtain material such as glass which is supported by a plurality of horizontal members 22 and vertical members 23 which can be drawn back when the weather is suitable.

The propulsion means 13 may be a unit constructed integrally with the rear barge unit or it may be a tug or tow type vessel of a conventional nature which is used to move barges along rivers and the like. Conventional flexible connectors, not shown, are provided to hook or connect the individual barge units 12 together into an integral system.

Figure 2:
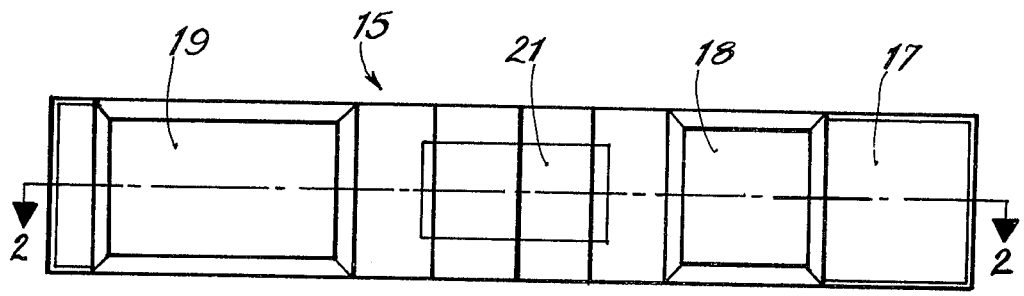
FIG. 2 is a top view of one unit in a typical arrangement.
Figure 3:
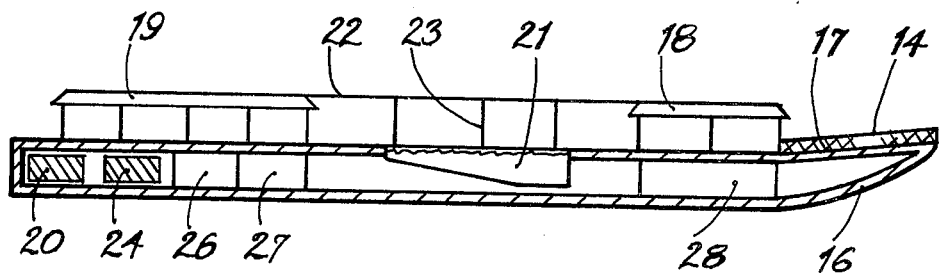
FIG. 3 is a cross-section taken along line 2—2 of FIG. 2.

FIG. 2 is a top view of a typical recreation unit 15 having a rake end 16 while FIG. 3 is a cross-sectional view of the unit 15 which shows further details such as the water storage tanks 20 and sewage holding tanks 24. Space is also provided for the generating unit 26 and general storage 27. Since the cruises will probably last for several days, it is necessary to provide a crew living quarters 28 which are situated beneath the building 18.

Figure 4:
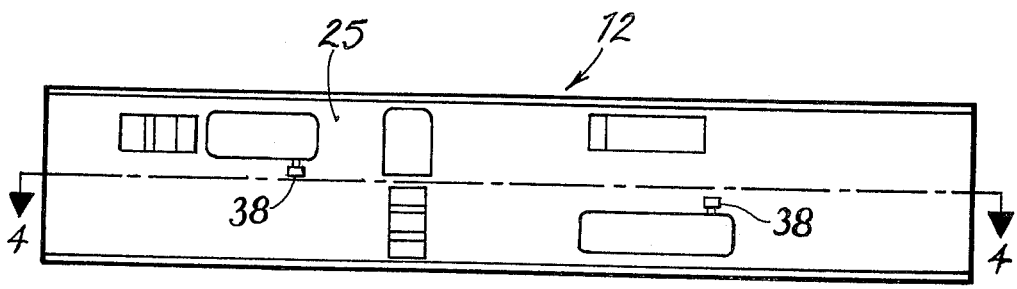
FIG. 4 is a top view of another typical unit in the campground arrangement; and, FIG. 5 is a cross-sectional view taken along line 4—4 of FIG. 4
Figure 5:
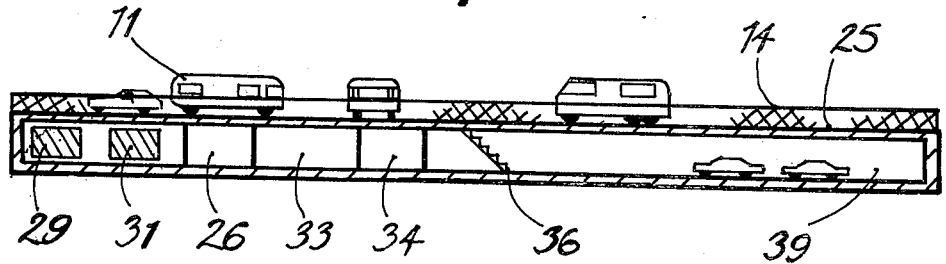

FIGS. 4 and 5 disclose one of the other unit 12 in greater detail with water storage tanks and sewage holdings tanks 29 and 31 and separate generating facilities 32 below the deck 25. Since the individuals will be living in their vehicles 11, on the campground units 12, toilet and shower facilities 33 and laundry 34 are provided with steps 36 leading down to the lower level. A space 39 for automobile storage is also provided with access either through an elevator (not shown) or a special entry arrangement (not shown) such as a ramp or door. While the drawings show the various units 12 divided vertically into compartments, it is always possible that the units 12 may be compartmentalized horizontally with the different utilities located, perhaps, on a lower level and the intermediate space used for recreation purposes.

The invention as thus disclosed provides a unique floating campground for recreational vehicles, wherein the individuals are living in their own vehicles at a moderate cost while being transported in a floating campground to various destinations. At any point, one can depart from the transport system for purposes of sightseeing or could remain on board for several days or weeks as the case might be. Since the units 12 in FIG. 1 are of a modular nature, any number of different hookups can be provided depending upon the popularity of the various arrangements. The transport system is designed to provide a family vacation environment at a reasonable cost. With the system disclosed above, one can cruise over rivers and other inland waterways for scheduled periods while enjoying the facilities on board. Furthermore, the transport system of the present invention will result in fuel savings and lessened pollution from automobiles.

It is to be understood that the above-described arrangements are merely illustrative examples of the application. Numerous other arrangements may be readily devised by those skilled in the art which will embody the principals of the invention and fall within the spirit and scope thereof.

What is claimed is:

1. A floating campground for recreational vehicles comprising:
    at least one camping barge unit having a substantially flat upper deck surface and including utility hookups and services at predetermined intervals and means for securing recreational vehicles in a fixed position on said surface with sufficient space therebetween to simulate an actual campground,
    at least one recreational barge unit including a pool on the upper surface thereof and at least one enclosed structure mounted on the deck and having recreational facilities therein,
    flexible means for coupling the barge units together in a predetermined arrangement, and, propulsion means connected to one of said barge units for transporting the coupled units over waterways.

2. A floating campground for recreational vehicles in accordance with claim 1 wherein:
    the camping barge unit further includes a lower level beneath the upper deck surface, said level being compartmentalized vertically to provide a first compartment for parking automobiles, and a second compartment for water storage and sewage tanks.

3. A floating campground for recreational vehicles in accordance with claim 2 wherein:
    the lower level includes a third compartment for recreation purposes.

4. A floating campground for recreational vehicles in accordance with claim 2 wherein:
    the lower level is compartmentalized in a direction transverse to the axis of the barge unit.

5. A floating campground for recreational vehicles in accordance with claim 2 wherein:
    the camping barge unit further includes compartmentalized units beneath the upper deck for providing toilet and shower facilities, general storage and laundry facilities.

6. A floating campground for recreational vehicles in accordance with claim 1 wherein:
    a fence is provided about the perimeter of the flat upper deck surface and said surface comprises an artificial turf material to enhance the campground effect.

7. A floating campground for recreational vehicles in accordance with claim 1 wherein:
    the recreational barge unit includes a rake end portion extending in an upward curve from the bottom surface and an outwardly extending upper deck surface which comprises an open recreational area and includes a recreational structure located inwardly of said open area and an enclosed pool adjacent to said recreational structure, and,
    a second recreational structure at the other end of said pool.

8. A floating campground for recreational vehicles in accordance with claim 7 wherein:
    said pool is glass enclosed and includes a retractable upper ceiling.

9. A floating campground for recreational vehicles in accordance with claim 7 wherein:
    said pool includes glass wall portions, supporting members therefor and a retractable transparent ceiling.

10. A floating campground for recreational vehicles in accordance with claim 2 wherein:
    the propulsion means comprises a separate unit coupled to the transport system for transporting the coupled units over waterways.

* * * * *